United States Patent Office 2,973,386
Patented Feb. 28, 1961

2,973,386

PURIFICATION OF SYM DICHLORO-BIS(2,4,6-TRICHLOROPHENYL)UREA

Harry A. Weldon, Edgewood, Md., assignor to the United States of America as represented by the Secretary of War No Drawing. Filed Jan. 5, 1943, Ser. No. 471,371

11 Claims. (Cl. 260—553)

(Granted under Title 35, U.S. Code (1952), sec. 266)

The invention described herein may be manufactured and used by or for the Government for Governmental purposes, without the payment to me of any royalty thereon.

This invention relates generally to the manufacture of sym dichlor-bis(2,4,6 trichlorphenyl)urea, and it has particular relation to the purification of sym dichlor-bis(2,4,6 trichlorphenyl)urea when made on a quantity-production basis.

The compound sym dichlor-bis(2,4,6 trichlorphenyl)-urea is utilized in large quantities in connection with permeable protective clothing for protection against chemical warfare vesicant agents, and for related purposes. Rigid specifications have been set up for this compound in respect to, matter insoluble in chloroform, sieve size, moisture, chlorides such as NaCl, and corrected active chlorine. It has been found that when sym dichlor-bis(2,4,6 trichlorphenyl)urea is manufactured on a quantity-production basis to meet large, current war demands, a great deal of difficulty has been encountered in meeting the specifications, particularly in respect to matter insoluble in chloroform. This difficulty has resulted in the rejection of large quantities of this strategic product which might be otherwise acceptable.

Furthermore, in certain instances it is desirable to have a grade of sym dichlor-bis(2,4,6 trichlorphenyl)urea which has a higher degree of purity than that normally required to meet present specifications. However, with the present methods of manufacture it is very difficult to obtain a product having this extra degree of purity.

Accordingly, a primary object of this invention is the provision of a method whereby sym dichlor-bis(2,4,6 trichlorphenyl)urea made on a quantity-production basis and rejected because it cannot pass specifications in respect to impurities, may be readily and economically purified so as to avoid such rejection.

Another important object of the invention is the provision of a simple and economical method whereby undesirable impurities formed in the manufacture of sym dichlor-bis(2,4,6 trichlorphenyl)urea may be eliminated to a very high degree, even though the treated product could have initially met present specifications in respect to impurities.

These and other objects of the invention will be made more apparent on reference to the following detailed description of the invention setting forth by way of illustration certain specific methods and techniques of purification.

At the present time, there are two important processes by which sym dichlor-bis(2,4,6 trichlorphenyl)urea is made on a quantity-production basis. One of these processes is known as the "trichloraniline process" and the other is known as the "diphenyl urea process." The main steps of these processes are outlined according to the following equations:

TRICHLORANILINE PROCESS

Step I

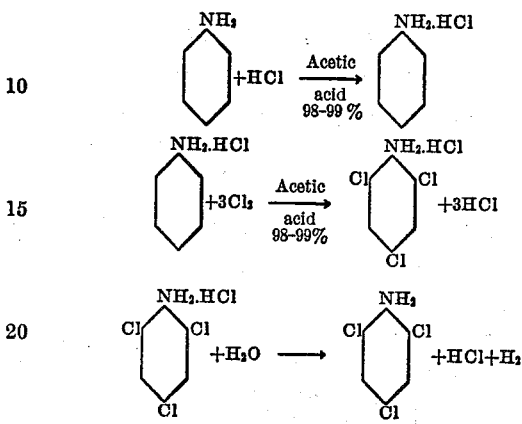

Step II

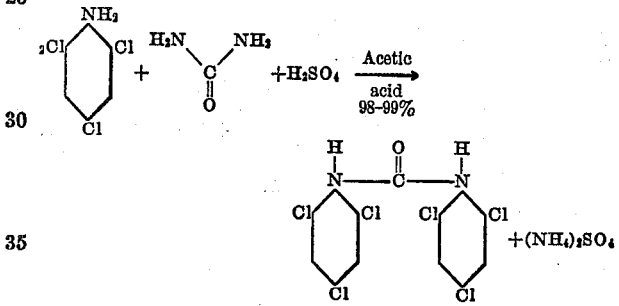

Step III

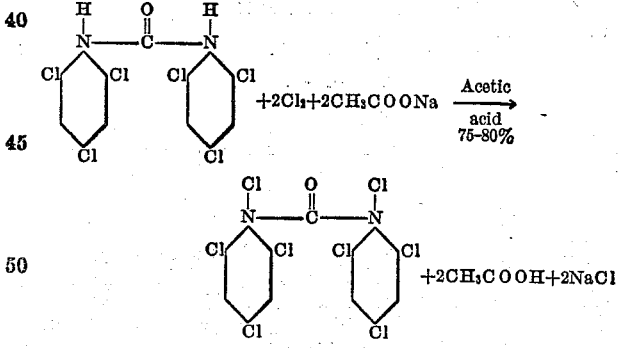

The principal impurity present in the final product made by the trichloraniline process appears to be sym bis(2,4,6 trichlorphenyl)urea, or hexachlordiphenyl urea.

DIPHENYL UREA PROCESS

Step I

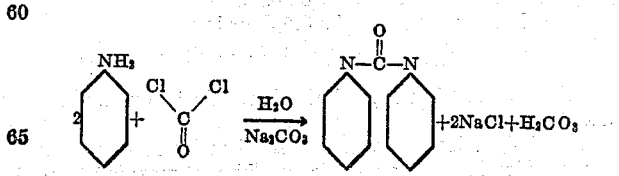

Step II

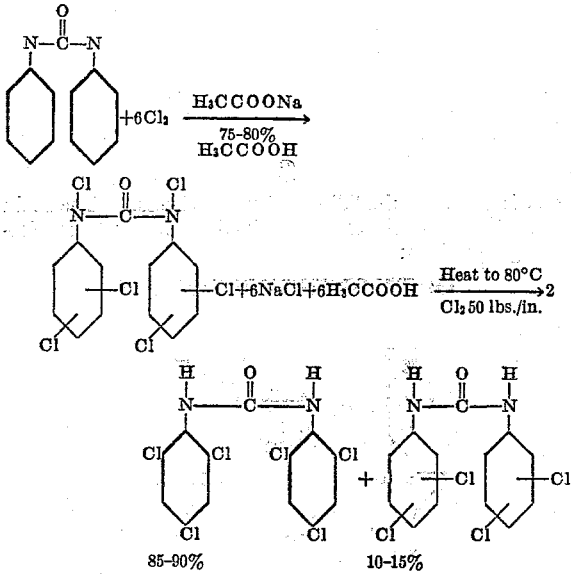

Step III

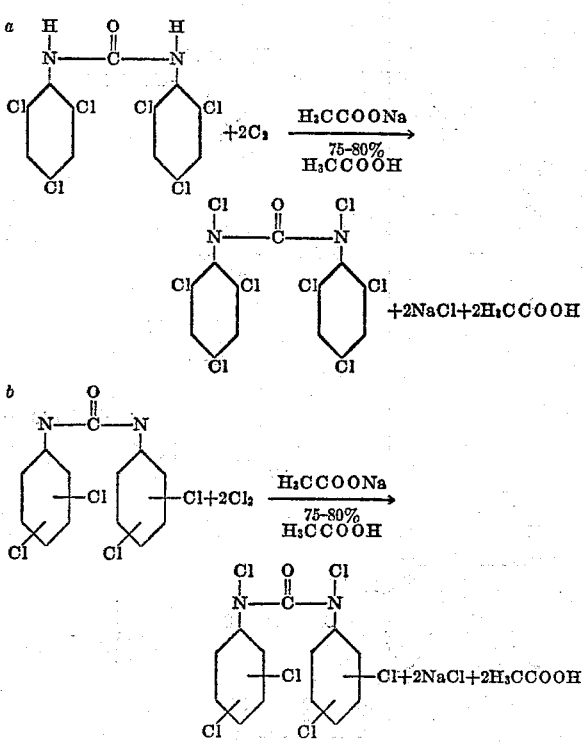

Normally the final product made by the diphenyl urea process will comprise about 90% sym dichlor-bis(2,4,6 trichlorphenyl)urea, and about 10% of a mixture consisting mostly of dichlor bis(dichlorphenyl)urea, bis(dichlorphenyl)urea, and sym bis(2,4,6 trichlorphenyl)urea. Also, there may be relatively small amounts of certain other impurities.

Briefly stated, the present specifications for the products made by both the trichloraniline process and the diphenyl urea process, are:

(1) Moisture content must be 0.2% or less.
(2) "Salt" content must be 0.5% or less.
(3) "Chloroform insoluble" content must be 4.25% or less.
(4) "Corrected active chlorine" must be between 14.20 and 14.65%.

The designation, "percent corrected active chlorine" of the specifications has a technically different meaning than "percent active chlorine." The "percent active chlorine" in a sample is obtained by dividing the weight of active chlorine in the sample by the total weight of the sample. Whereas, the "percent corrected active chlorine" of a sample is obtained by dividing the weight of active chlorine in the sample by the total weight of the sample minus the amount of "insolubles" and moisture contained in the sample.

Because of the fact that both the trichloraniline process and the diphenyl urea process are relatively complex from the standpoint of quantity-production, and because of control difficuties involved, the final product sym dichlorbis(2,4,6 trichlorphenyl)urea, in both cases, as stated above, often fails to meet the specifications, particularly in respect to the specification which limits the amount of impurities which are insoluble in chloroform.

It was unexpectedly found, according to this invention, that sym dichlor-bis(2,4,6 trichlorphenyl)urea made on a quantity-production basis, according to the above outlined processes and variations thereof, could be purified, by the use of strong sulfuric acid, particularly sulfuric acid of 90% strength or greater. Such a method of purification was not apparent or predictable, since it would normally be expected that strong sulfuric acid would materially attack and destroy the sym dichlor-bis(2,4,6 trichlorphenyl)urea which is a relatively complex and unstable organic compound. However, this method of purification has been thoroughly tested and it has been found that no substantial destruction or attack of the sym dichlor-bis(2,4,6 trichlorphenyl)urea takes place and that the active chlorine therein is not materially affected, if reasonable precautions are taken to insure that the temperature does not rise too high during treatment.

The conditions of treating the sym dichlor-bis(2,4,6 trichlorphenyl) urea product with sulfuric acid should be such that the temperature will not become higher than 50° C., and preferably, it should be kept at 30° C. or lower. The permissible temperature is to some extent dependent upon the concentration or strength of acid used and the period of contact with the acid, it having been found that, generally, the stronger the acid is, the lower the temperature must be, and likewise that, the longer the period of contact with the acid, the lower the temperature must be. The necessity of keeping the temperature under control is more pronounced when the acid is first brought into contact with the sym dichlor-bis (2,4,6 trichlorphenyl) urea, and later, when the acid is being washed out of the product with water.

The following are illustrative examples of different procedures according to which this invention may be satisfactorily practiced:

*Example 1*

After step III of either the trichloraniline process or the diphenyl urea process, described hereinbefore, the product obtained in either case is filtered and then the filter cake is washed with water in a centrifuge. After washing, the filter cake is whizzed as dry as practical in the centrifuge so that there will only be about 8% of water left in the centrifuged product.

With the centrifuge running at full speed, the cake is next washed with cold strong sulfuric acid. If desired the first acid wash may be with somewhat weaker acid and then with cool acid of increasing strength until the desired concentration of acid for the extraction is attained. Washing of the cake with strong acid is continued, maintaining the temperature at about 20° C. until experience or tests indicate that the impurities have been removed to the desired degree, and then the cake is whizzed as free of the strong sulfuric acid as is practical in the centrifuge. In order to check whether or not the sym dichlor-bis (2,4,6 trichlorphenyl) urea has been sufficiently treated with the strong acid, a small sample of the filter cake may be taken, washed free of acid with cold water, dried to a predetermined moisture content, and then analyzed for impurities.

After the removal of the acid, with the centrifuge running at full speed, the cake is washed with very cold water. If desired, the first wash may consist of somewhat weaker acid and then with cold acid of decreasing strength until water alone is used. The cake is finally washed with warm water until free of sulfuric acid.

*Example II*

The washed and dried sym dichlor-bis(2,4,6 trichlorphenyl)urea product, made by either the trichloraniline or diphenyl urea process, either in the form of filter cake or in ground form, is shoveled into a strong sulfuric acid bath contained in a suitable vessel equipped with an efficient agitator and a cooling coil or jacket through which a suitable cooling medium may be circulated in order to keep the temperature of the bath within the desired temperature range. Instead of using a jacket or cooling coil, Dry Ice may be added to the acid bath at such a rate that the temperature thereof is maintained within the desired temperature range. The product to be purified is fed into the acid bath at such a rate that the temperature can be conveniently controlled. The rate of feed is important, especially in cases where the product to be purified contains considerable moisture. The agitation should be such that a uniform cool slurry is formed as rapidly as possible so as to prevent local overheating of the product.

The slurry from the vessel is filtered so as to remove the mother liquor. The filtration may be satisfactorily carried out in such standard equipment as Nutsch type filters, Oliver type filters, or centrifuges. After removal of the mother liquor, the filter cake is washed with additional quantities of strong sulfuric acid so as to remove remaining impurities. The final washing should be nearly colorless in order to insure that substantially all of the impurities have been removed.

The next operation of washing out the sulfuric acid from the filter cake may be satisfactorily accomplished by any suitable method of washing, such as one of the following:

(1) The filter cake containing the sulfuric acid is slowly charged into a large amount of very cold, well agitated, water, care being taken to keep the temperature under control and to avoil local overheating.

(2) Instead of washing the filter cake with water directly after the treatment with strong sulfuric acid, quantities of cold sulfuric acid of progressively decreasing strengths may be first employed so that the heat evolved will be sufficiently small to permit close control of the temperature.

(3) Where an Oliver type filter has been used in obtaining the filter cake, the design of the filter and the relatively little thickness of the sections of the filter cake, permit water to be forced through the cake at such a rate that the tempeature rise of the cake will be sufficiently small to permit the use of cold water directly on the cake containing strong sulfuric acid, without reaching a temperature that will seriously affect the sym dichlor-bis(2,4,6 trichlorphenyl)urea.

In practicing the invention according to the methods outlined in the foregoing examples, a substantial part of the sulfuric acid may be re-used with satisfactory results. In this way it is possible to economize in respect to the amount of fresh sulfuric acid required. However, when previously used acid is employed certain precautions should be observed in order to obtain satisfactory results. If the product to be treated contains considerable moisture, then it is better to use fresh or clean acid for at least the first washing in order to remove the moisture. For, if previously used acid is employed on a filter cake of sym dichlor-bis(2,4,6 trichlorphenyl) urea containing considerable moisture, then the impurities in the used acid will be "drowned out" due to the dilution of the acid by the moisture. The "drowned out" impurities are usually not crystalline and tend to plug the pores of the filter cake, thereby reducing the rate of filtration therethrough and in certain instances, resulting in the destruction of the batch because of excessive rise in temperature. Furthermore, it will be necessary to wash the "drowned out" impurities from the cake. Accordingly, where considerable moisture is present in the filter cake to be purified, fresh (clean) acid should be used before previously used acid comes into contact with the product, unless the filter cake is to be charged into previously used strong sulfuric acid contained in a vessel provided with an efficient agitator.

Previously used acid should be capable of dissolving more impurities fairly efficiently, and should not contain precipitate. And, previously used acid should be substantially completely washed from the filter with fresh strong acid before water is brought into contact with the cake. Otherwise the impurities in the used acid will be "drowned out" by the water.

It will be understood that the methods of practicing the invention outlined above are by way of illustration and that certain modifications thereof and certain other methods may be developed and used by those skilled in the art embodying the fundamental principles of the invention.

The following tables illustrate the results obtainable by the application of the purification method of this invention to different batches of quantity produced sym dichlor-bis(2,4,6 trichlorphenyl)urea which have failed to meet specifications in respect to chloroform insoluble material, high active chlorine, low active chlorine, and high salt, respectively:

TABLE I

[Product failing to meet specifications because of too high chloroform insolubles]

| Run No. | Before treatment | | | After treatment | | |
|---|---|---|---|---|---|---|
| | Percent Insol. | Percent Active Cl | Percent Corrected Active Cl | Percent Insol. | Percent Active Cl | Percent Corrected Active Cl |
| 1 | 4.60 | 13.66 | 14.29 | 2.35 | 14.16 | 14.52 |
| 2 | 4.85 | 13.70 | 14.39 | 2.07 | 14.22 | 14.53 |
| 3 | 4.27 | 13.88 | 14.53 | 0.86 | 14.47 | 14.59 |
| 4 | 21.85 | 10.69 | 13.69 | 0.65 | 14.45 | 14.56 |
| 5 | 5.67 | 13.76 | 14.59 | 1.73 | 14.27 | 14.52 |
| 6 | 11.76 | 12.76 | 14.47 | 2.22 | 14.19 | 14.53 |
| 7 | 10.05 | 12.99 | 14.45 | 1.77 | 14.22 | 14.48 |

TABLE II

[Product failing to meet specifications because of too high "corrected active chlorine"]

| Before treatment | | | After treatment | | |
|---|---|---|---|---|---|
| Percent Insol. | Percent Active Cl | Percent Corrected Active Cl | Percent Insol. | Percent Active Cl | Percent Corrected Active Cl |
| 2.11 | 14.36 | 14.67 | 0.67 | 14.36 | 14.47 |

TABLE III

[Product failing to meet specifications because of too low "corrected active chlorine"]

| Before treatment | | | After treatment | | |
|---|---|---|---|---|---|
| Percent Insol. | Percent Active Cl | Percent Corrected Active Cl | Percent Insol. | Percent Active Cl | Percent Corrected Active Cl |
| 2.92 | 13.69 | 14.10 | 1.40 | 14.10 | 14.30 |

TABLE IV
[Product failing to meet specifications because of too high salt content]

| Run No. | Before treatment | | | After treatment | | |
|---|---|---|---|---|---|---|
| | Percent Salt | Percent Active Cl | Percent Corrected Active Cl | Percent Salt | Percent Active Cl | Percent Corrected Active Cl |
| 1 | 0.51 | 13.94 | 14.37 | 0.13 | 14.31 | 14.48 |
| 2 | 3.05 | 13.36 | 14.47 | 0.00 | 14.22 | 14.48 |
| 3 | 0.57 | 13.97 | 14.48 | 0.31 | 14.07 | 14.50 |

The practicability of treating lots of sym dichlor-bis(2,4,6- trichlorphenyl)urea rejected for different reasons, so as to bring the same well within the specifications, is clearly shown by the data given in the above tables. For an illustration of the extent of purification that may be accomplished by this invention in an extreme case, attention is called to the results of run No. 4, in Table I, wherein a batch of rejected sym dichlor-bis(2,4,6 trichlorphenyl)urea having an unusual amount of impurities insoluble in chloroform was brought well within specifications.

The following table gives illustrative analyses of a batch of sym dichlor-bis(2,4,6 trichlorphenyl)urea before and after purification according to the invention and shows the degree of purification that may be effected:

TABLE V

| Composition | Before Treatment, Percent | After Treatment, Percent |
|---|---|---|
| Sym bis(2,4,6 trichlorphenyl) urea and salt | 2.1 | 0.7 |
| Dichlorbis(dichlorphenyl)urea | 15.8 | 2.8 |
| Bis(dichlorphenyl)urea | 1.8 | 1.0 |
| Sym dichlor-bis(2,4,6 trichlorphenyl)urea | 80.4 | 95.5 |

It is important to note that sym dichlor-bis(2,4,6 trichlorphenyl)urea purified according to this invention is not only as stable as a good grade of the product which has met specifications without purification, but there is some indication that the purified product may have more than normal stability. The following table shows the stability of a sample of sym dichlor-bis(2,4,6 trichlorphenyl)urea purified by the sulfuric acid treatment of the invention:

TABLE VI

| Date | Percent Insol. | Percent Salt | Percent Active Cl | Percent Corrected Active Cl |
|---|---|---|---|---|
| First stability test | 0.76 | 0.03 | 14.44 | 14.56 |
| Three weeks and two days after first test | 0.79 | | 14.43 | 14.56 |
| Three weeks and four days after 2nd test | | | 14.44 | 14.56 |
| Four months and thirteen days after 3rd test | 0.80 | 0.01 | 14.39 | 14.56 |

In addition to the purification of sym dichlor-bis(2,4,6 trichlorphenyl)urea, the principle of this invention may be also applied to other purposes. One such additional purpose is that of cleaning filter media and equipment used in the manufacture of sym dichlor-bis(2,4,6 trichlorphenyl)urea, providing the same are of a type not injured by strong sulfuric acid. Thus the "Alumdun" block type of filter media used in Nutsch type filters are adapted to be cleaned with strong sulfuric acid. Heretofore, the useful life of this type of filter media has been materially shortened because the pores of the blocks become plugged with various solids during their use in the manufacture of sym dichlor-bis(2,4,6 trichlorphenyl)urea. A very large portion of these solid particles is soluble in strong sulfuric acid, and cleaning therewith opens the pores in the blocks and thus increases materially the useful life of this type of filter media.

Since certain changes and modifications may be made in the foregoing methods, procedures and materials of and for practicing the invention without departing from the scope thereof, it is intended that all matter described hereinbefore shall be interpreted as illustrative and not in a limiting sense.

I claim:
1. The method of purifying and removing chloroform insolubles from sym dichlor-bis(2,4,6 trichlorphenyl)urea which comprises treatment with strong sulfuric acid.
2. In the method of preparing sym dichlor-bis(2,4,6 trichlorphenyl)urea which comprises chlorinating sym bis(2,4,6 trichlorphenyl)urea, the steps of purifying the resulting sym dichlor-bis(2,4,6 trichlorphenyl)urea by treating the product of chlorination with strong sulfuric acid.
3. In the method of preparing sym dichlor-bis(2,4,6 trichlorphenyl)urea which comprises chlorinating sym bis(2,4,6 trichlorphenyl)urea, the step of purifying the resulting sym dichlor-bis(2,4,6 trichlorphenyl)urea by treating the product of chlorination with sulfuric acid of at least 90% strength and at a temperature not exceeding 50° C.
4. In the method of preparing sym dichlor-bis(2,4,6 trichlorphenyl)urea which comprises condensing urea with 2,4,6 trichloraniline to obtain sym bis(2,4,6 trichlorphenyl)urea, and chlorinating the sym bis(2,4,6 trichlorphenyl)urea to obtain sym dichlor-bis(2,4,6 trichlorphenyl)urea, the step of purifying and removing chloroform insolubles from the resulting sym dichlor-bis(2,4,6 trichlorphenyl)urea by treating the product of chlorination with strong sulfuric acid.
5. In the method of preparing sym dichlor-bis(2,4,6 trichlorphenyl)urea which comprises condensing urea with 2,4,6 trichloraniline to obtain sym bis(2,4,6 trichlorphenyl)urea, and chlorinating the sym bis(2,4,6 trichlorphenyl)urea to obtain sym dichlor-bis(2,4,6 trichlorphenyl)urea, the step of purifying and removing chloroform insolubles from the resulting sym dichlor-bis(2,4,6-trichlorphenyl)urea by washing the product of chlorination with sulfuric acid of at least 90% strength and at a temperature not exceeding 50° C.
6. In the method of preparing sym dichlor-bis(2,4,6 trichlorphenyl)urea which comprises reacting 2,4,6 trichloraniline with urea in the presence of sulfuric acid and 98–99% acetic acid so as to obtain sym bis(2,4,6 trichlorphenyl)urea and ammonium sulfate, and chlorinating the sym bis(2,4,6 trichlorphenyl)urea in the presence of sodium acetate and 75–80% acetic acid to obtain impure sym dichlor-bis(2,4,6 trichlorphenyl)urea, the method of purifying and removing chloroform insolubles from the impure sym dichlor-bis(2,4,6 trichlorphenyl)urea comprising washing the product of chlorination with sulfuric acid of at least 90% strength at a temperature not exceeding 50° C. and finally removing the acid from the product with water.
7. In the method of preparing sym dichlor-bis(2,4,6 trichlorphenyl)urea which comprises reacting aniline with hydrochloric acid in the presence of 98–99% acetic acid so as to obtain aniline hydrochloride, chlorinating the aniline hydrochloride in the presence of 98–99% acetic acid so as to obtain 2,4,6 trichloraniline, reacting the 2,4,6 trichloraniline with urea in the presence of sulfuric acid and 98–99% acetic acid so as to obtain sym bis(2,4,6 trichlorphenyl)urea and ammonium sulfate, and chlorinating the sym bis(2,4,6 trichlorphenyl)urea in the presence of sodium acetate and 75–80% acetic acid to obtain impure sym dichlor-bis(2,4,6 trichlorphenyl)urea, the method of purifying and removing chloroform insolubles from the impure sym dichlor-bis(2,4,6 trichlorphenyl)urea comprising first washing the product of chlorination with sulfuric acid of at least 90% strength at a tem- perature within the range of about 20° C. to 30° C. and finally removing the acid from the product with water.

8. In the method of preparing sym dichlor-bis(2,4,6 trichlorphenyl)urea which comprises chlorinating diphenyl urea to obtain sym bis(2,4,6 trichlorphenyl)urea, and chlorinating the sym bis(2,4,6 trichlorphenyl)urea to obtain sym dichlor-bis(2,4,6 trichlorphenyl)urea, the step of purifying the resulting sym dichlor-bis(2,4,6 trichlorphenyl)urea by treating the product of chlorination with strong sulfuric acid.

9. In the method of preparing sym dichlor-bis(2,4,6 trichlorphenyl)urea which comprises chlorinating diphenyl urea to obtain sym bis(2,4,6 trichlorphenyl)urea, and chlorinating the sym bis(2,4,6 trichlorphenyl)urea to obtain sym dichlor-bis(2,4,6 trichlorphenyl)urea, the step of purifying and removing chloroform insolubles from the resulting sym dichlor-bis(2,4,6 trichlorphenyl)urea by washing the product of chlorination with sulfuric acid of at least 90% strength at a temperature not exceeding 50° C.

10. In the method of preparing sym dichlor-bis(2,4,6 trichlorphenyl)urea which comprises chlorinating diphenyl urea in the presence of sodium acetate and about 75–80% acetic acid so as to obtain sym bis(2,4,6 trichlorphenyl)urea, and chlorinating the sym bis(2,4,6 trichlorphenyl)urea in the presence of sodium acetate and 75–80% acetic acid so as to obtain impure sym dichlor-bis(2,4,6 trichlorphenyl)urea, the method of purifying and removing chloroform insolubles from the impure sym dichlor-bis(2,4,6 trichlorphenyl)urea comprising washing the product of chlorination with sulfuric acid of at least 90% strength at a temperature not exceeding 50° C. and removing the acid from the product with water.

11. In the method of preparing sym dichlor-bis(2,4,6 trichlorphenyl)urea which comprises phosgenating aniline in the presence of a sodium carbonate solution so as to obtain diphenyl urea, chlorinating the diphenyl urea in the presence of sodium acetate and about 75–80% acetic acid so as to obtain sym bis(2,4,6 trichlorphenyl)urea, and chlorinating the sym bis(2,4,6 trichlorphenyl)urea in the presence of sodium acetate and 75–80% acetic acid so as to obtain impure sym dichlor-bis(2,4,6 trichlorphenyl)urea, the method of purifying and removing chloroform insolubles from the impure sym dichlor-bis(2,4,6 trichlorophenyl)urea comprising first washing the product of chlorination with sulfuric acid of at least 90% strength, at a temperature within the range of about 20° C. to 30° C., and finally removing the acid from the product with water.

References Cited in the file of this patent

UNITED STATES PATENTS 2,284,685    Detrick et al. _____ June 2, 1942